United States Patent [19]

Goodman

[11] Patent Number: 4,617,624
[45] Date of Patent: Oct. 14, 1986

[54] MULTIPLE CONFIGURATION MEMORY CIRCUIT

[76] Inventor: James B. Goodman, 9600 Golf Lakes Trail, Apt. 2010, Dallas, Tex. 75231

[21] Appl. No.: 600,371

[22] Filed: Apr. 16, 1984

[51] Int. Cl.[4] .................. G06F 12/00; G06F 13/00
[52] U.S. Cl. .................................. 364/200; 364/900
[58] Field of Search ... 364/200 MS File, 900 MS File

[56] References Cited

U.S. PATENT DOCUMENTS 4,271,466  2/1981  Yamamoto et al.
4,280,176  7/1981  Tan.
4,473,877  9/1984  Tulk.

OTHER PUBLICATIONS

Texas Instruments, Inc., "The TTL Data Book for Design Engineers", 2nd edition, 1981.
Texas Instruments, Inc., "1981 Supplement to the TTL Data Book for Design Engineers", 2nd edition, 1981.
Intel, "Microprocessor and Peripheral Handbook", 1983.
Eggegbrecht, "Interfacing to the IBM Personal Computer", 1983.
OKI Semiconductor, "MSM5832 Microprocessor Real-Time Clock/Calendar", 1982.
Monolithic Memories, "Programmable Array Logic Family", 1981.
INTERSIL, "ICL8240, ICL8250, ICL8260 Programmable Timers/Counters".
Texas Instruments, Inc., "Series 24 and 28 Standard, Low-Power, Power Down, Registered, Programmable, Read Only Memories", 1981.

Primary Examiner—James R. Hoffman
Attorney, Agent, or Firm—Hubbard, Thurman, Turner & Tucker

[57] ABSTRACT

A memory circuit to be connected to a central processing unit through an information bus and including a memory bank for storing several data words with each word having its own unique address, and including control circuitry enabling a user to obtain a data word having an address within a first address space in response to a first set of control signals and enabling the user to obtain a second data word having a second address contained within a second address space in response to a second set of control signals wherein the second address space are the addresses not included in the first address space. Also detailed is an embodiment that provides two modes of operation for a memory apparatus. In the first operational mode, the apparatus functions as a standard memory providing one word per address. In the second configuration, the memory provides a series of data words in accordance with the single address and an address incrementing signal.

16 Claims, 11 Drawing Figures

MULTIPLE CONFIGURATION MEMORY CIRCUIT

BACKGROUND

1. Field of the Invention

This invention relates to memory for data processing equipment and more specifically, to user configurable memory architectures for data processing equipment.

2. Description of the Prior Art

Traditional memory structures according to the Princeton or Harvard architectures, include storage capability for several data words that are each individually addressable by a central processing unit (CPU). This memory is directly accessible by having the CPU excecute an instruction that contains the address of the data to be accessed. In this manner, the CPU may either read or write data into the memory. Due to the addressing limitations of the instruction words for the CPU (i.e., the number of bit locations allocated for addresses), large volumes of data must be stored externally to the CPU memory. This is commonly done in external storage devices such a magnetic tape, hard or floppy discs. Such external devices are typically accessed by using a single address with an additional signal to load data into the CPU as a series of data words. This external memory configuration is advantgeous in that it provides storage for large bulk data that cannot be stored within the CPU addressable memory space. However, the disadvantages are that the external memory devices are inefficient for single word access and are basically much slower than the directly addressable memory of the CPU.

The object of the present invention is to provide memory that is directly accessible by the central processing unit and also memory which is accessible through the same configuration as an external memory device, but with a much faster access time. Additionally, the user is given the capability to determine which portion of the memory is directly addressable by the CPU and which portion is accessible as if it were an external peripheral.

SUMMARY OF THE INVENTION

In accordance with the present invention, a memory circuit is provided that is connected to a central processing unit (CPU) through an information bus with the memory circuit including a memory bank for retaining several data words with each data word having a unique address within a specific address space and with control circuitry connected to the information bus for obtaining one data word from or providing one data word to the memory bank in response to an address within a first set of addresses within the address space and in response to a first set of control signals. The memory circuit further includes the capability for obtaining at least one data word from or providing at least one data word to the memory bank in response to a second set of control signals and in response to an address within a second set of addresses with the second set of addresses being the address space except for the first set of addresses. The address space is contiguous within limits specified by the user.

In the preferred embodiment, the memory circuit provides for the user to preselect address values defining the address space and the first and second set of addresses. This embodiment further provides for the user to select the addresses for INPUT/OUTPUT ports including a serial and parallel port in addition to a real time clock which are all addressable by the information bus.

In a further embodiment, the memory circuit includes error correction and error detection capability wherein data words in both memory address spaces each include error syndrome bits that enable the memory circuit to correct single bit and detect multiple bit errors.

In a still further embodiment, the memory circuit provides for two central processing units to share this memory bank to provide intercommunication between these two central processing units using two separate information buses connected to the single memory bank.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENT

This invention includes a memory peripheral circuit that provides at least two modes of access to the memory contained therein. In the first mode, a central processing unit (CPU) is used to access memory in a direct fashion. In the second mode, the CPU accesses the peripheral memory in an indirect fashion.

In the preferred embodiment, this indirect memory access resembles to the CPU, the access of a disc memory storage device. In this preferred embodiment, the user is able to determine what portion of this peripheral memory may be accessed directly by the CPU with the remaining portion being accessed by the CPU as if it were a disc storage device.

Figure 1:
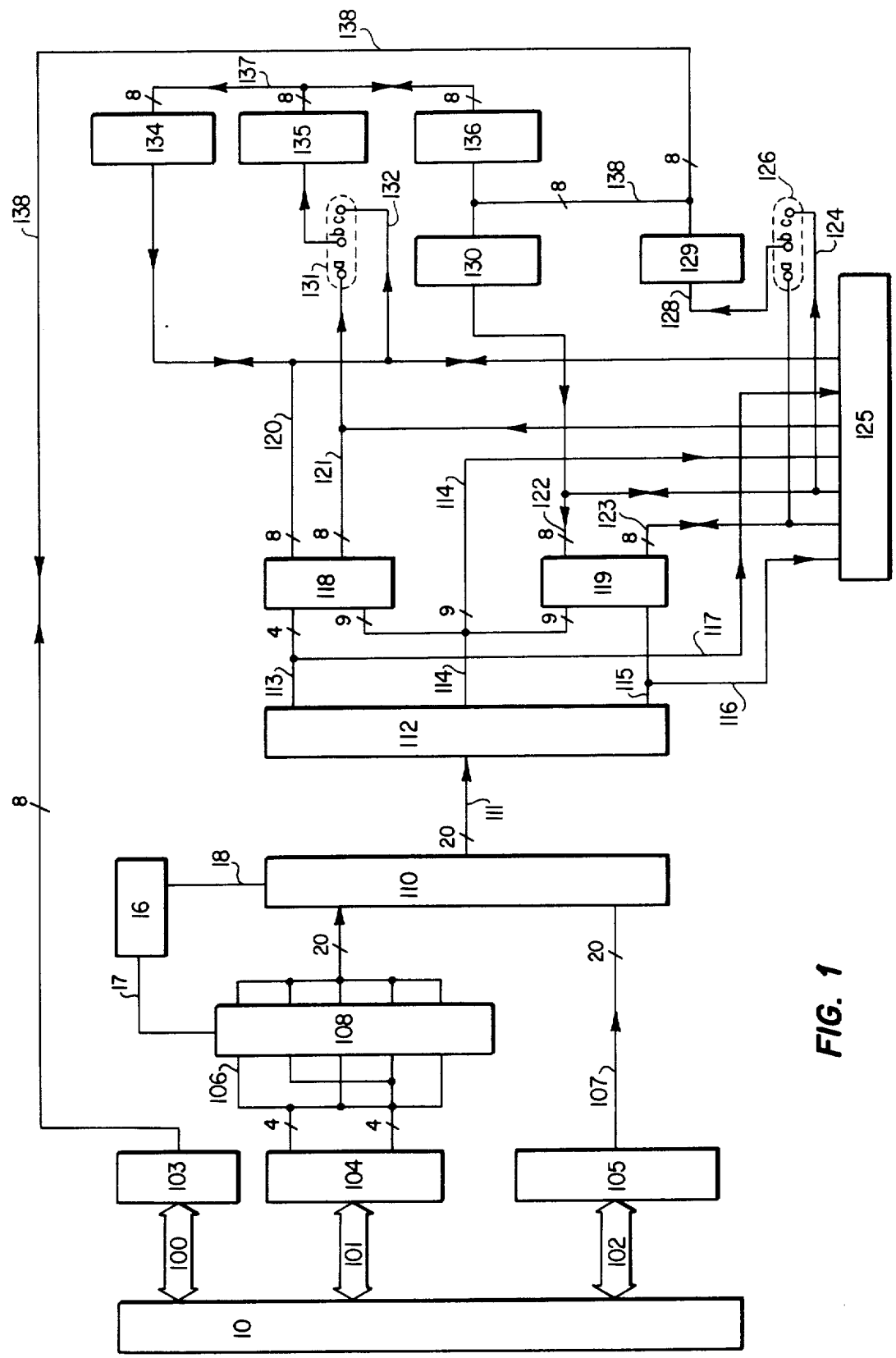
FIG. 1 is a block diagram of the memory device.

A block diagram of the preferred embodiment is illustrated in FIG. 1. An information bus 10 connected to the CPU (not shown) is connected to data lines 100 and 101 and address lines 102. The user, in initializing the board, selects inclusive address limits for the peripheral memory that may be accessed by the CPU directly. The remaining peripheral memory is then accessible as if it were a disc or, in other words, in an address incrementing mode. The peripheral control logic 16 contains several data ports which are addressable by the CPU over the bus 10. The contents of these control data ports, and the configuration of several peripheral jumper lines or switches, will determine the configuration as it appears to the CPU. Therefore, when an address is received by the address buffer 105 via lines 102, a determination is made by the control logic 16 as to which mode (i.e., direct access or ram disc access) the peripheral is in. If the peripheral board is in a direct access mode, control logic 16 determines that the address received by buffers 105, and input onto lines 107, is multiplexed by the address select logic 110 onto lines 111, into controller 112. If the peripheral board is in a disc access mode, the address is initially input into counter circuitry 108 and is then incremented after each data transaction by data received from bus 10 via lines 101 through buffer circuitry 104 through lines 106 under the control of the control circuitry 16 via lines 17 as shown. This address contained in counter circuitry 108 is input to the address selection circuit 110 via line 109 and is selected to be input to the memory controller 112 via line 111 as shown.

The memory controller 112 is connected to two memory banks, 118 and 119. Memory bank 118 represents the odd memory bank, and memory bank 119 represents the even address memory bank. The odd and even terms refer to the odd and even address boundaries of the bytes contained by the respective memory banks. Each memory bank 118 and 119 include eight bits of data plus a data check bit for a total of nine bits. Data is written into memory bank 118 from lines 120 and buffer 134. Likewise, data is written in to memory bank 119 via lines 122 connected to buffer 130. Data output from memory bank 118 or 119 is placed in a data latch 135 or 129 respectively. Data from either memory bank 118 or 119 is placed on data lines 138 through bus transceiver 136. The data on lines 138 is in output onto bus 10 via buffers 103 on lines 100. Bus transceiver 136 is bi-directional and also directs the input data into either buffers 134 or 130 in accordance with odd or even address boundaries. Jumper configurations 126 and 132 are provided to enable the user to implement an error correcting coding option that involves a daughter board circuit configuration represented by block 125. In a non error correcting mode, nodes A and B of jumpers 126 and 132 are connected. Therefore, data written into the memory banks 118 and 119 are addressed by lines 113 and 115 respectively which provide the column address and row address. For example, data directed into memory bank 118 is contained on line 138 and read through the transceiver 136 and transmitted to buffers 134 via line 137, whereupon the data is input into memory bank 118 via line 120. When this data is to be placed on bus 10, the data is transported from memory 118 via line 121 through jumper 132 directly to the latch 135 whereupon it is switched onto lines 138 by the transceiver 136 and then transported to the bus 10 via buffers 103 and lines 100. A similar flow exists for memory bank 119.

During error correction, however, the nodes B and C are connected to jumpers 126 and 131. When data is input to memory bank 118 from lines 138, the data is transmitted to buffers 132 via line 137 and then via lines 120 to block 125. The address of the word being selected is also transferred to block 125 via lines 114 and lines 117. The error correction circuitry 125 then computes a set of check bits. In the preferred embodiment, when a single byte is being accessed, six check bits are generated for a sixteen bit word. Therefore, the contents of the unaccessed memory, in this example memory bank 119, is accessed along with the data that is being stored. This bank data, and data to be stored, is input to the error correction circuitry 125 whereupon the six check bits are computed. Four of these check bits for the sixteen bit word are stored within the error correction circuitry 125 and the other two are stored each in its respective memory bank 118 or 119. Therefore, data from the error correction circuitry is input to the memory bank back on lines 120 into memory bank 118. When data is output from the memory bank 118, it is transported to error correction circuitry 125 via lines 121 whereupon the error correction computation is performed. If an error has occurred and the error is correctable, the data will be corrected accordingly. The corrected data is then output on lines 132 through jumpers 131 onto lines 133 to latch 135 where it is output to bus 10 as previously described. If a non-correctable error has occurred, an interrupt will be generated.

Figure 2A:
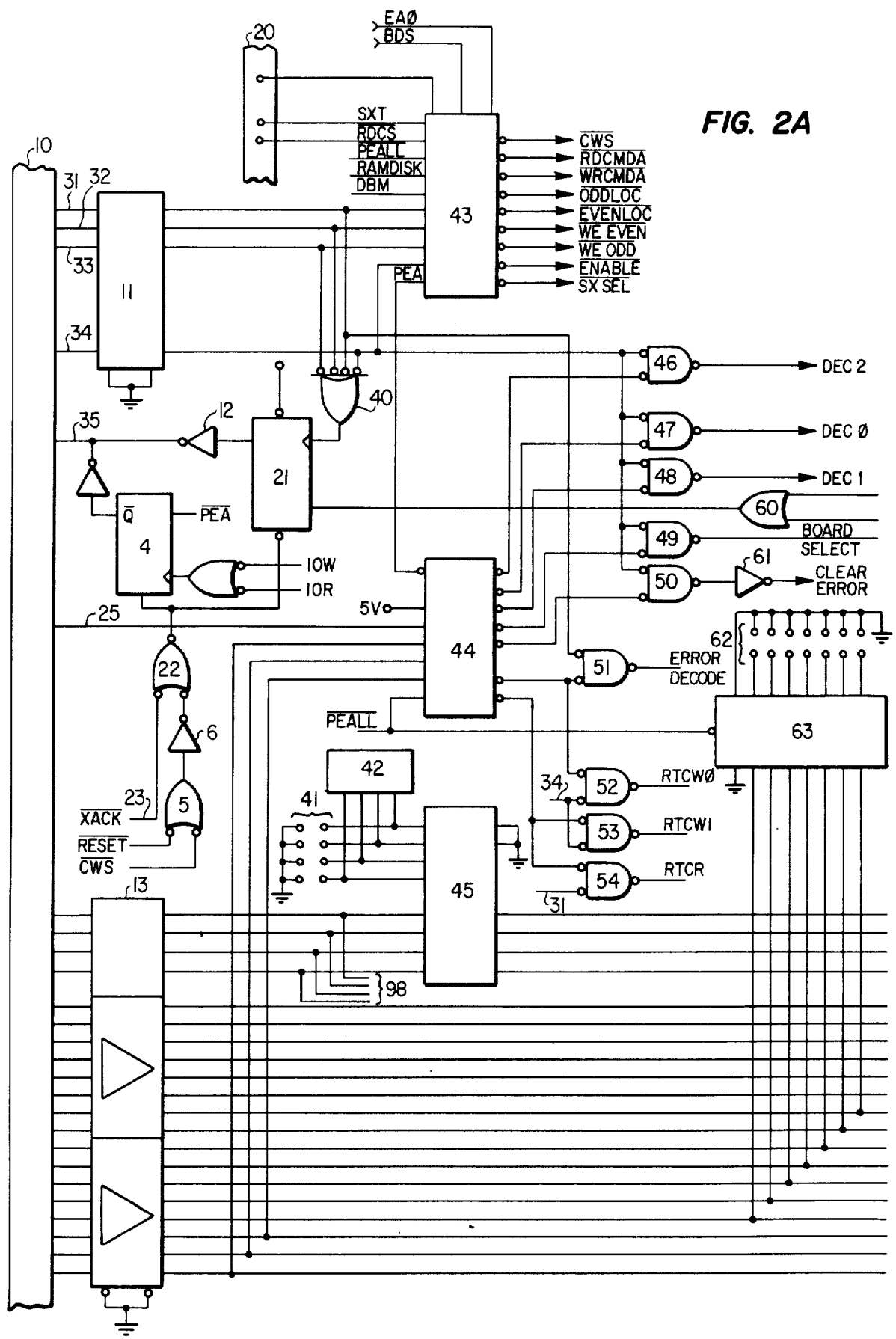
FIGS. 2A and 2B are schematic diagrams of the address control circuitry.
Figure 2B:
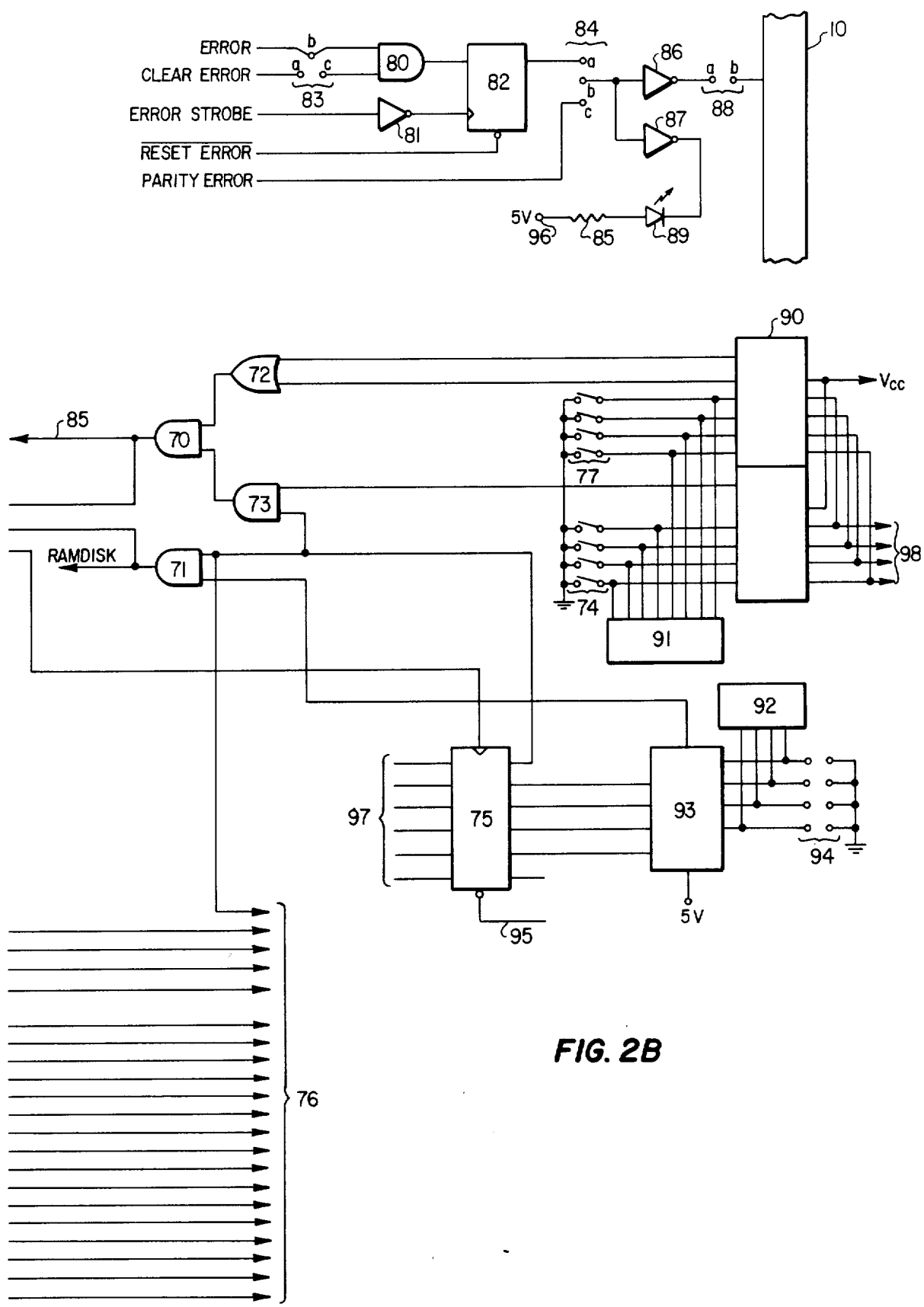

FIGS. 2A and 2B illustrate the address control logic for the preferred embodiment. Referring to FIG. 2A, the information bus 10 is connected to provide an information path from the CPU to this memory peripheral device. In the preferred embodiment, the CPU is an Intel 8088 in an IBM PC configuration. The signal lines on bus 10 are described in *Interfacing to the IBM Personal Computer* by Lewis C. Eggebrecht, First Edition, 1983 and which is herein incorporated by reference. Chapter 4 of this publication explains the operation of this information bus including timing diagrams showing the bus protocol for memory and INPUT/OUTPUT (I/O) cycles. In the preferred embodiment, the memory cycles are used to access banks of random access memory (RAM) directly for certain user specified addresses. The remaining portion of RAM is accessed in a serial fashion resembling the access of data on a disc mass storage device. Since there is no actual disc in this peripheral, this mode is referred to as the Ramdisk mode. In Ramdisk mode, the I/O bus operations are used. Chapter 5 contains the descriptions of the individual signals for the bus 10 in this preferred embodiment, and specifically FIG. 5-1 illustrates the signal connections. Chapter 6 contains bus timing information. Chapters 7 and 8 contain certain electrical, mechanical and power properties of bus 10.

In FIG. 2A, the bus 10 is connected to bus receivers 11 (in the preferred embodiment a 74F244) for receiving lines 31, 32, 33 and 34 which are I/O READ-, MEMORY READ-, MEMORY- and I/O- respectively. A flip-flop 21 (in the preferred embodiment, a 74S74) is connected to an inverter 12 and line 35 to bus 10 to generate the READY signal. The flip-flop 21 is used for maintaining a wait state to maintain the IBM PC CPU in a wait state during a memory access as described in Chapter 13 of *Interfacing to the IBM Personal Computer*. Flip-flop 21 is reset by a NOR gate 22 which receives either a TRANSFER ACKNOWLEDGE signal from the memory controller or an output from OR gate 5 and inverter 6 indicating a RESET signal or a wait state signal. The output of gate 22 also resets a D flip-flop 4 which receives a port enable all signal $\overline{PEA}$ and an ORed input from I/O READ and I/O WRITE. The output of flip-flop 4 is inverted and output to line 35. Line 25 is an address enable line connected to a decoder 44 (in the preferred embodiment, a 74LS138) which is used with a comparator 63 (in the preferred embodiment, a 74LS682) to determine the operational state of this peripheral memory device. The address lines themselves from bus 10 are connected to drivers 13 which provide these address signals to the peripheral. Some of the control signals for ths memory device are output from programmable array logic (PAL) device 43. The inputs and outputs of PAL 43 are contained in Table I. Table II contains the logic equations within the PAL 43 to provide the output signals indicated in Table I and in the preferred embodiment are implemented in a PAL Series 20 chip by Monolithic Memories Inc. In addition, OR gate 40 is tied to I/O READ, MEMORY READ-, MEMORY WRITE-, I/O WRITE-, to produce a wait state signal for flip-flop 21. Flip-flop 21 is also connected to an OR gate 60 which in turn receives a board select code signal and Ramdisk mode signal from AND gates 70 and 71 on FIG. 2B. When either of these modes are selected, flip-flop 21 is placed in a state to output a wait state command on information bus 10. The address decoder 44 is connected to three address lines as shown. The comparator 63 is connected to seven of the address lines and further is connected to jumpers 62. The comparator 63 is also connected to decoder 44. Decoder 44 and comparator 63 serve as addressing control logic to enable the user to access eight control ports for this memory device. These control ports contain control information for determining the operation of memory device. Port 0 (the first addressable port) contains a four bit (nibble) board select address. Up to sixteen of these memory devices may be included on an information bus 10 under the present configuration. Therefore, these four bits provide the address of each of the memory peripheral device boards. A fifth bit is used to determine whether or not the memory peripheral device is in Ramdisk or memory mode. The sixth bit position is used to note an error correcting test mode for an optional error correcting feature. Ports 1, 2 and 3 contain the initial address of the Ramdisk. Specifically, a 20 bit address is used which includes four bits in port 1 and the sixteen bits of ports 2 and 3. Port 4 contains the eight bit data which is either read from or written to the Ramdisk. Port 5 is addressed to clear parity on the memory peripheral device board. Port 6 provides eight error coding syndrome bits to the bus 10 for the optional error correcting feature of this memory peripheral device and provides eight bits of input to an optional real time clock. Port 7 provides both read and write capability to the real time clock. If the user desires to initialize, set or control the real time clock, both ports 6 and 7 would be used.

Therefore, the output of decoder 44 controls selection of these control ports. Specifically, NAND gate 46 selects port 3. NAND gate 47 selects port 1. NAND gate 48 selects port 2. NAND gate 49 selects port 0. NAND gate 50 selects port 5. NAND gate 51 selects port 6. NAND gates 52, 53 and 54 are used to control ports 6 and 7 for the real time clock operation. A bipolar ROM 45 is used with pullup resistors 42 and jumpers 41 to set a base address for this memory peripheral device in the overall memory map for the CPU system.

Referring to FIG. 2B, comparator 90 (74LS85) is connected to four bits of the address bus via lines 98 (from FIG. 2A) and further connected to two sets of switches 74 and 77 tied to a bank of pullup resistors 91. Switches 77 enable the user to select the minimum address for the memory to be directly accessed on this memory peripheral device. Switches 74 allow the user to select the maximum address for the memory to be directly accessed on this memory peripheral device. The circuitry connected to comparator 90 thus allows the user to select what memory of the RAM memory available on this memory peripheral device can be directly accessed by the CPU via bus 10. Comparator 90 is then connected to OR gate 72 and AND gate 73 to provide the memory mode board select signal output from AND gate 70 and the Ramdisk mode signal output from AND gate 71. The Ramdisk addresses are selected by the user by setting jumpers 94 which are in turn connected to a pullup resistor bank 92 and further connected to the comparator 93 (74LS85). This comparator has an output also tied to AND gate 71 to provide the Ramdisk mode signal output from AND gate 71 (74LS174). The flip-flop 75 is conncted to the RESET line 95 and sixth data line 97 to provide input to AND gate 71.

Figure 3A:
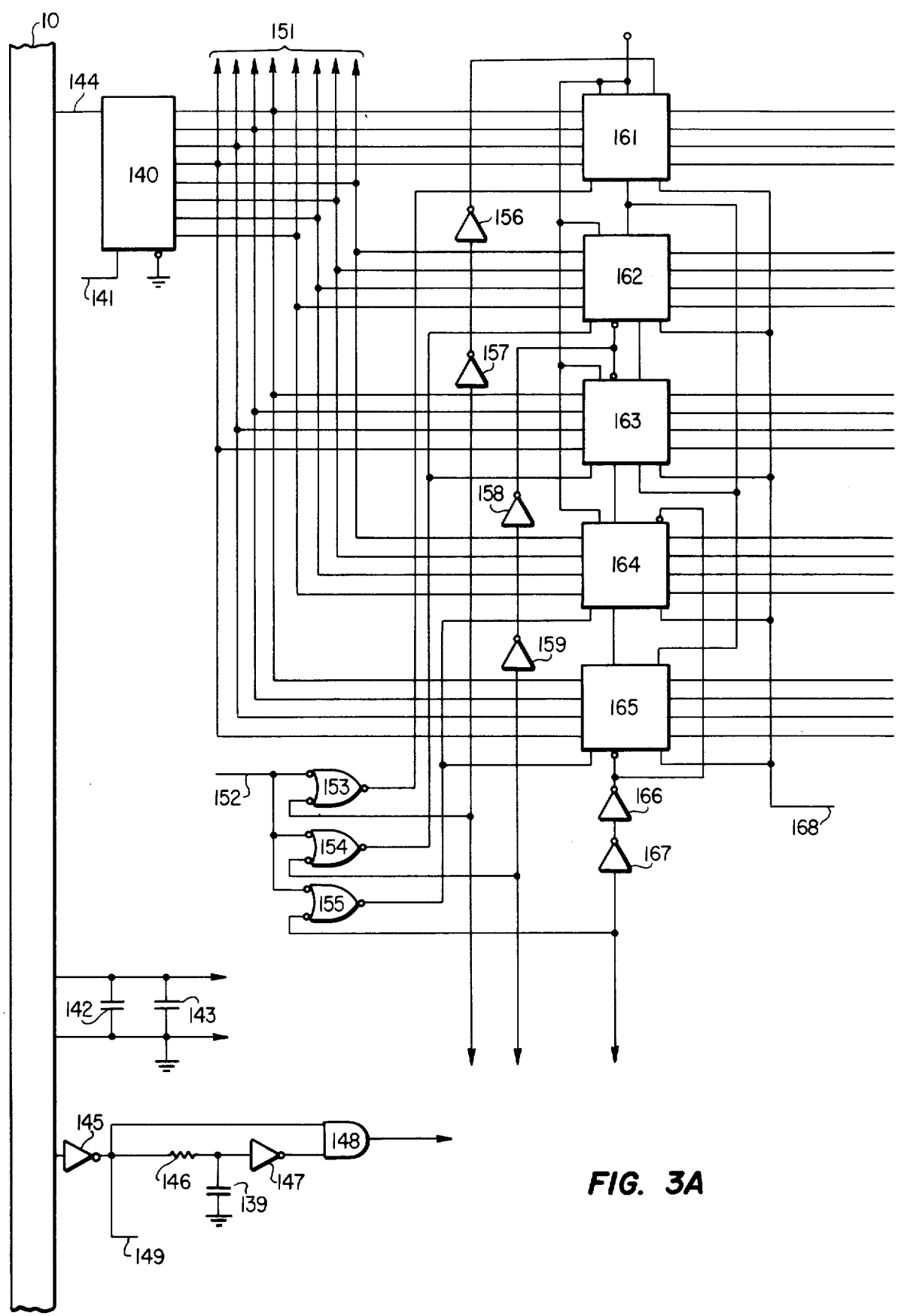
FIGS. 3A and 3B are schematic diagrams of the address incrementing circuitry.
Figure 3B:
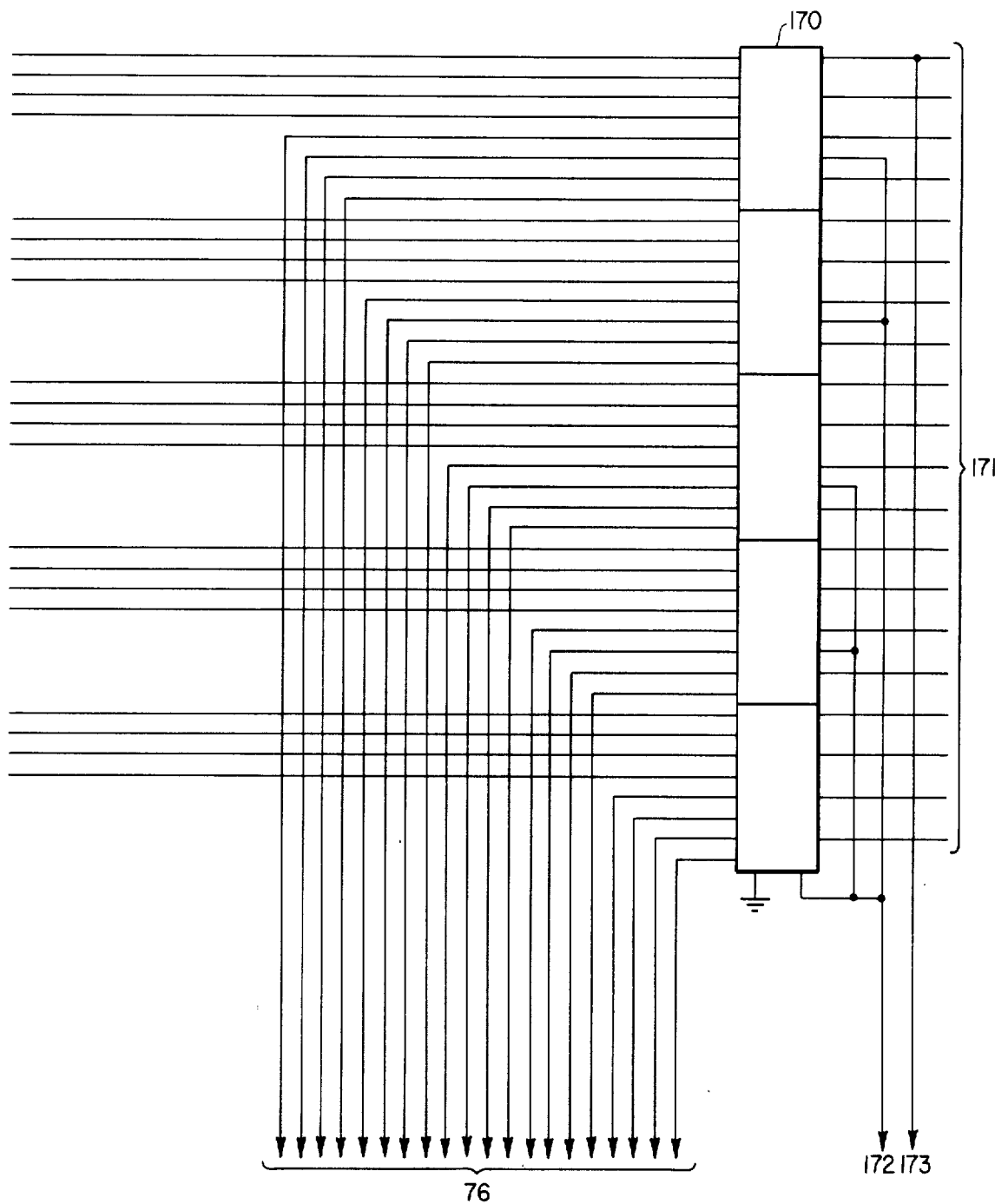

FIGS. 3A and 3B illustrate the circuitry for ports 1, 2 and 3 and for the memory data buffer 140 (74LS245) which is connected via a plurality of data lines represented as line 144 to the information bus 10. This buffer includes an input enable line 141 that allows data to be input through buffer 140 on the lines represented by 151 which are interconnected to counters 161-165 (74LS163A). Port 1 includes four bits and is counter 161 connected to port 1 ENABLE lines through delay inverters 156 and 157. Port 2 includes counters 162 and 163 connected to the port 2 ENABLE line containing delay inverters 158 and 159. Port 3 includes counters 164 and 165 connected to the port 3 ENABLE line with inverters 166 and 167. Line 168 is RESET-. Counters 161-165 are further controlled by NOR gates 153 though 155. These NOR gates include an input 152 which is the TRANSFER ACKNOWLEDGE signal from an Intel 8207 memory controller. This signal is received when data on the bus is valid and is used in conjunction the respective port enable signals to increment the address contained within the counters 161-165. Capacitors 142 and 143 are connected to the information bus 10 for decoupling. Inverter 145 receives the RESET signal from the bus 10 which is output on line 149 and also connected to timing circuitry which includes a capacitor 139, inverter 147, resistor 146 and an AND gate 148 which outputs a RESET signal.

Referring to FIG. 3B, multiplexer 170 (74LS157) is connected to the output of counters 161-165 and to address lines 76 which correspond to lines 76 on FIG. 2B. The multiplexers 170 provide either the counter address for the the Ramdisk mode or the address lines 76 for the memory access mode on lines 171. Line 172 is Ramdisk mode signal that is used to control the state of multiplexers 170. Line 173 contains the address zero bit used in even and odd memory bank selection.

Figure 4A:
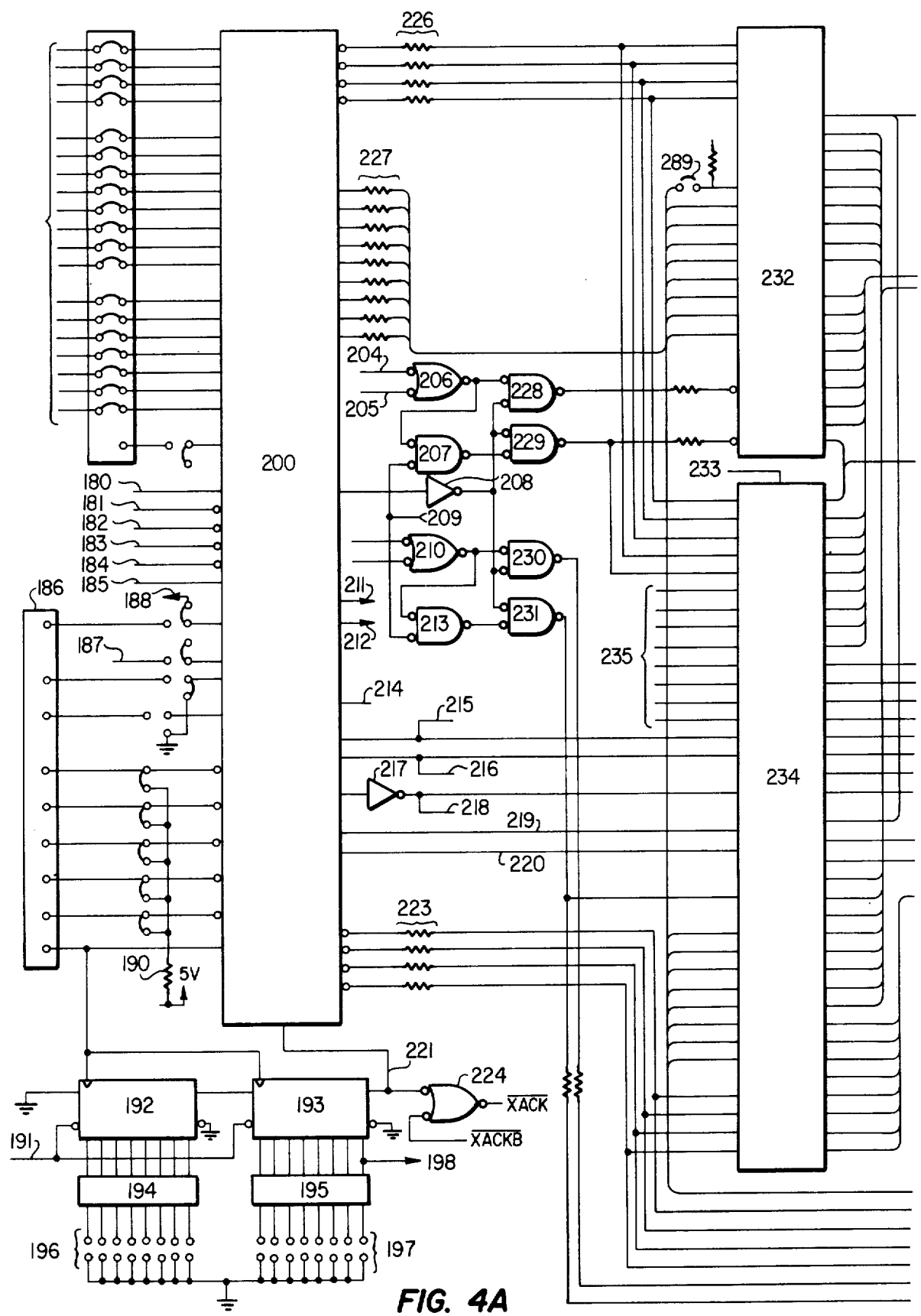
FIGS. 4A and 4B are schematic diagrams of the memory bank and memory control circuitry.
Figure 4B:
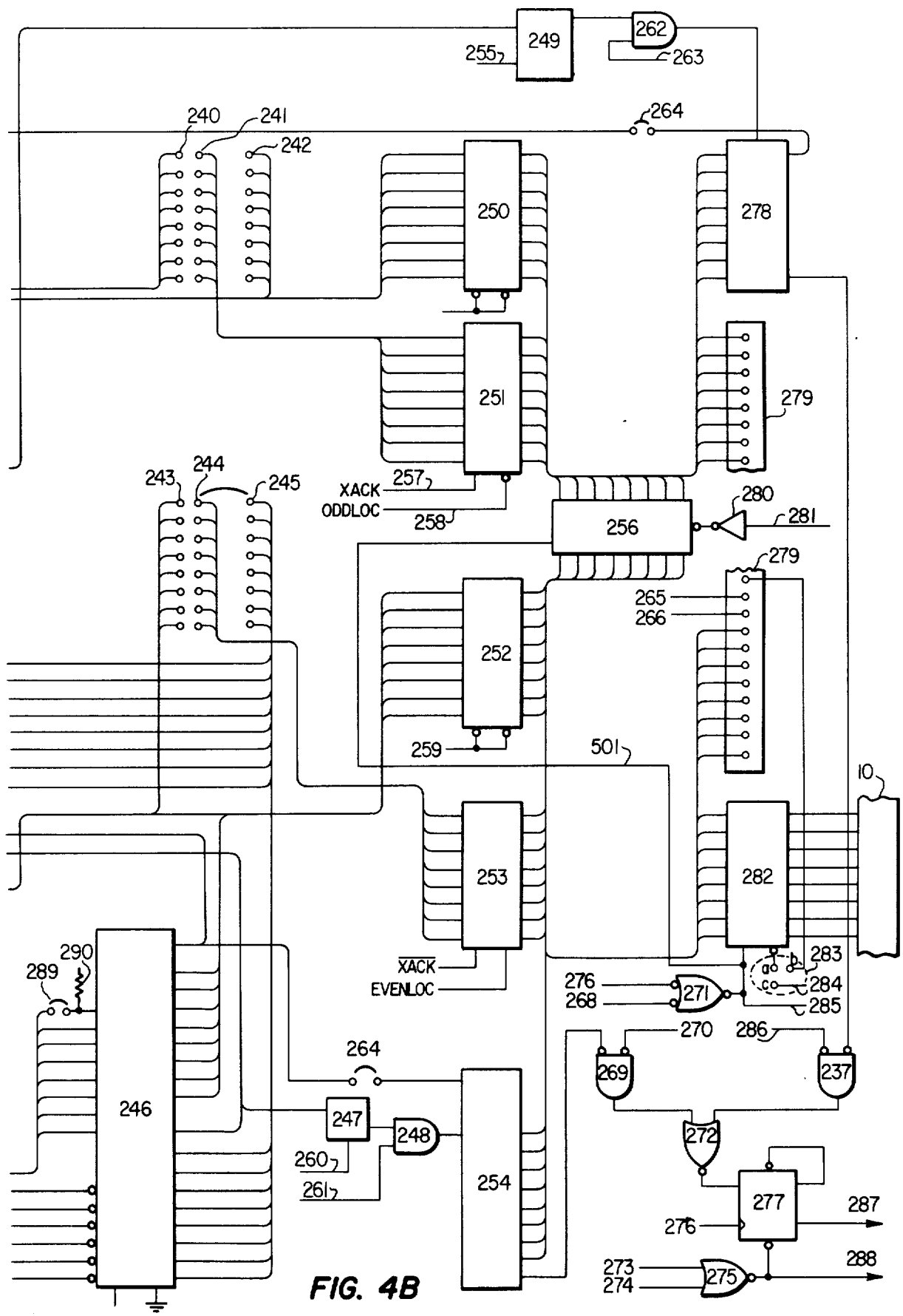

FIGS. 4A and 4B illustrate the memory controller 200 connected to an odd memory bank 232 and an even memory bank 246. If the preferred embodiment, the memory controller 200 is an Intel 8207 Advanced Dynamic RAM Controller. The technical description of the controller 200 is contained within the description of the Intel 8207 published by Intel in July, 1983, which is herein incorporated by reference. Referring to FIG. 4A, controller 200 is connected to a connector 171 which in turn connects the address lines to the controller 200. Connector 171 is provided for a processor interface that would allow two CPUs to access the same memory bank. Lines 180-185 are control lines from the PAL 43 from FIG. 2A. Line 180 is a clock signal from an oscillator circuit not shown. Lines 181-185 are the READ COMMAND, WRITE COMMAND, ENABLE, TRANSFER ACKNOWLEDGE (XACK) and RESET signals respectively. Connector 186, in addition to the jumpers that are tied to memory controller 200, are the connection for the second processor for a control signal similar to lines 181-185. In this preferred embodiment, these lines are tied to five volts through resistor 190 to disable these lines. The memory controller is programmable through two parallel loading serial registers (74LS165) 192 and 193 which are connected to jumpers 196, 197 through resistor networks 194 and 195. FIGS. 9 and 10, in the data description for the Intel 8207, detail the switching alternatives to enable the user to properly program the RAM controller using jumpers 196 and 197. Line 191 is provided to RESET the registers 192 and 193. Line 221 from register 193 provides the transfer acknowledge signal XACKA for the IBM bus. XACKA is combined with XACKB from the coprocessor bus in NAND gate 224 to provide XACK. A signal on line 198 signifies that the memory controller is to be programmed to function with an error correcting controller. The error correcting controller is connected to the memory controller 200 via connector 234. The row and column select lines from the memory controller 200 are output to the odd memory bank 232 via the lines including resistors 226 and to the even bank 346 via lines that include the resistors 223. These resistors are provided to reduce ringing, as are the address line resistors 227. A WRITE ENABLE signal is input into inverter 208 which is connected to logic gates 206, 207, 228 and 229 on one side and logic gates 210, 213, 320 and 231 on the other side. NOR gate 206 receives the WRITE ENABLE ODD signal on line 204 and the SIXTEEN SELECT signal on line 205. NOR gate 210 receives the WRITE ENABLE EVEN signal and the SIXTEEN SELECT signal. The output of NAND gate 228 is a WRITE CYCLE ENABLE for odd memory bank 232. The output of NAND gate 230 is a WRITE CYCLE ENABLE for the even memory bank 246. The outputs of NAND gate 229 and NAND gate 231 provide the capability to change the parity bits within the odd and even memory banks 232 and 246. Lines 211 and 211 provide the PORT ENABLE and the PORT SELECT signals to lines 265 and 266 of connector 279 in FIG. 4B. Line 214 is the DISABLE BYTE MARK input to PAL 43. Lines 215 and 216 are the ERROR and CLEAR ERROR signals respectively. Inverter 217 provides the ERROR STROBE signal on line 218. Lines 219 and 220 are the READ/WRITE and the WRITE/ENABLE lines respectively. Lines 235 of the error correcting circuitry 234 provide the control signals output to the memory for both the Ramdisk and memory access modes. Jumper 289 for the odd memory bank 232 and even memory bank 246 are provided to enable the RAM banks to be upgraded from 64K dynamic RAM chips to 256K dynamic RAM chips.

The jumpers to 240, 236, 241, 243, 244 and 245 in FIG. 4B provide the user the capacity to program this memory peripheral for either error correcting or non error correcting modes. If error correcting is selected, jumpers 240 would be connected to jumpers 241 and jumpers 243 would be connected to jumpers 244. Likewise, in the non-correcting mode, jumpers 241 would be connected to jumpers 242 and jumpers 244 would be connected to jumpers 245. As part of the error correcting capability, jumper 264 would be connected to enable the parity generators 278 and 254 to generate parity bits. Parity generators 278 and 254 in the preferred embodiment are 74LS280 devices. Parity generator 278 is connected to a D flip-flop 249 which is in turn connected to the LOAD ODD signal from lines 235 input to the D flip-flop on line 255. Likewise, the flip-flop 257 receives the LOAD EVEN signal from lines 235 input to flip-flop 247 on line 260. The WRITE COMMAND signal is input to the NAND gates 262 via lines 263 and NAND gate 248 via line 261 to enable the parity generators 278 and 254. The parity generators 254 and 278 are also connected to AND gates 269 and 237 together with the EVEN LOCATION signal from line 270 and the ODD LOCATION signal on line 286 to provide inputs to NOR gate 272 where output is input to D flip-flop 277 with the READ COMMAND signal on line 276 to provide the parity error output on line 287. The CLEAR ERROR signal on line 273 and the RESET signal on line 274 are input to NOR gate 275 to provide a RESET to the D flip-flop 277 and provide the RESET ERROR signal on line 288. Data within the RAM is output to latches 253 and 251 to be connected to a bidirectional buffer (LM245) 256. Latch 251 includes the ODD LOCATION signal on line 258 and the XACK (TRANSFER ACKNOWLEDGE) signal on line 257. Latch 252 includes the LOAD EVEN signal on line 259. Latch 253 includes the EVEN LOCATION signal on line 227 and the XACK signal on line 201. Data from buffer 256 is input to the memory banks from buffers 250 and 253 respectively. The bidirectional buffer 256 controls the direction of data flow via line 501 from line 285 which is an output from NOR gate 271. The NOR gate 271 receives the I/O READ- signal on line 267 and the MEMORY READ- signal on line 268 to determine the best direction on line 265 which is also input to buffer 256 via line 501. Jumpers 283 are connected appropriately to enable the tri-state buffer (74LS245) 282 to interface to bus 10 in a coprocessor mode. Bidirectional buffer 256 is further controlled by inverter 280 in line 281 which includes the SIXTEEN SELECT signal from PAL 43 in FIG. 2A.

Figure 5A:
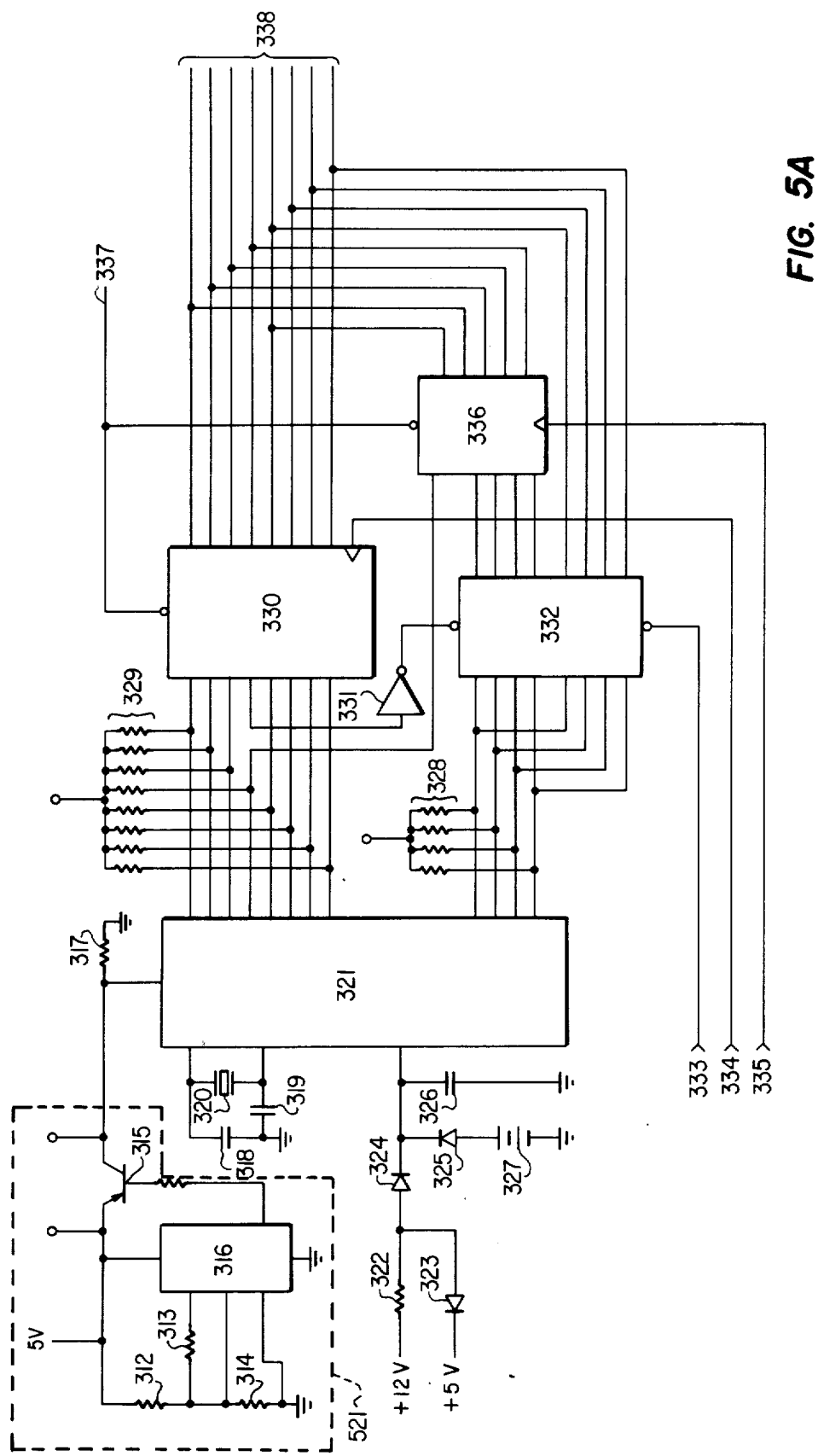
FIGS. 5A and 5B are schematic diagrams of the real time clock circuitry and the serial INPUT/OUTPUT port circuitry.

FIG. 5A illustrates a real time clock circuit utilizing the OKI semiconductor MSM5832 Microprocessor Real-time Clock/Calendar described in its April, 1982 data sheet herein incorporated by reference. This real time clock as illustrated in FIG. 5A is block 521 which include device 316 connected to resistors 312, 313, 314 and 317 with transistor 315. This circuitry provides a signal to clock 321 that the power supply is good. If the power supply is not good, then a battery 327 is used to back up the real time clock 321. This battery 327 is connected a resistor 322 which is connected to a 12 volt power supply and a diode 323 which is connected to a 5 volt power supply. Diodes 324 and 325 provide for the current flow from battery 327 into clock 321. Capacitor 326 is the filter capacitor. Crystal 320 and capacitors 318 and 319 are oscillator circuits for clock 321. The output of clock 321 includes latches (74LS243) 330 and 336 I/O buffer (74LS244) 332 and pullup resistors 329 and 328. Control lines 333, 334 and 335 represent RTCR-RTCR-, RTCW 0- and RTCW 1- from FIG. 2A and represent the read signal for the real time clock, and the two write commands for loading data into ports 6 and 7 as previously discussed. Line 337 contains the RESET signal which is used to reset latches 330 and 336. The input and output data for the real time clock is contained on data lines 338.

Figure 5B:
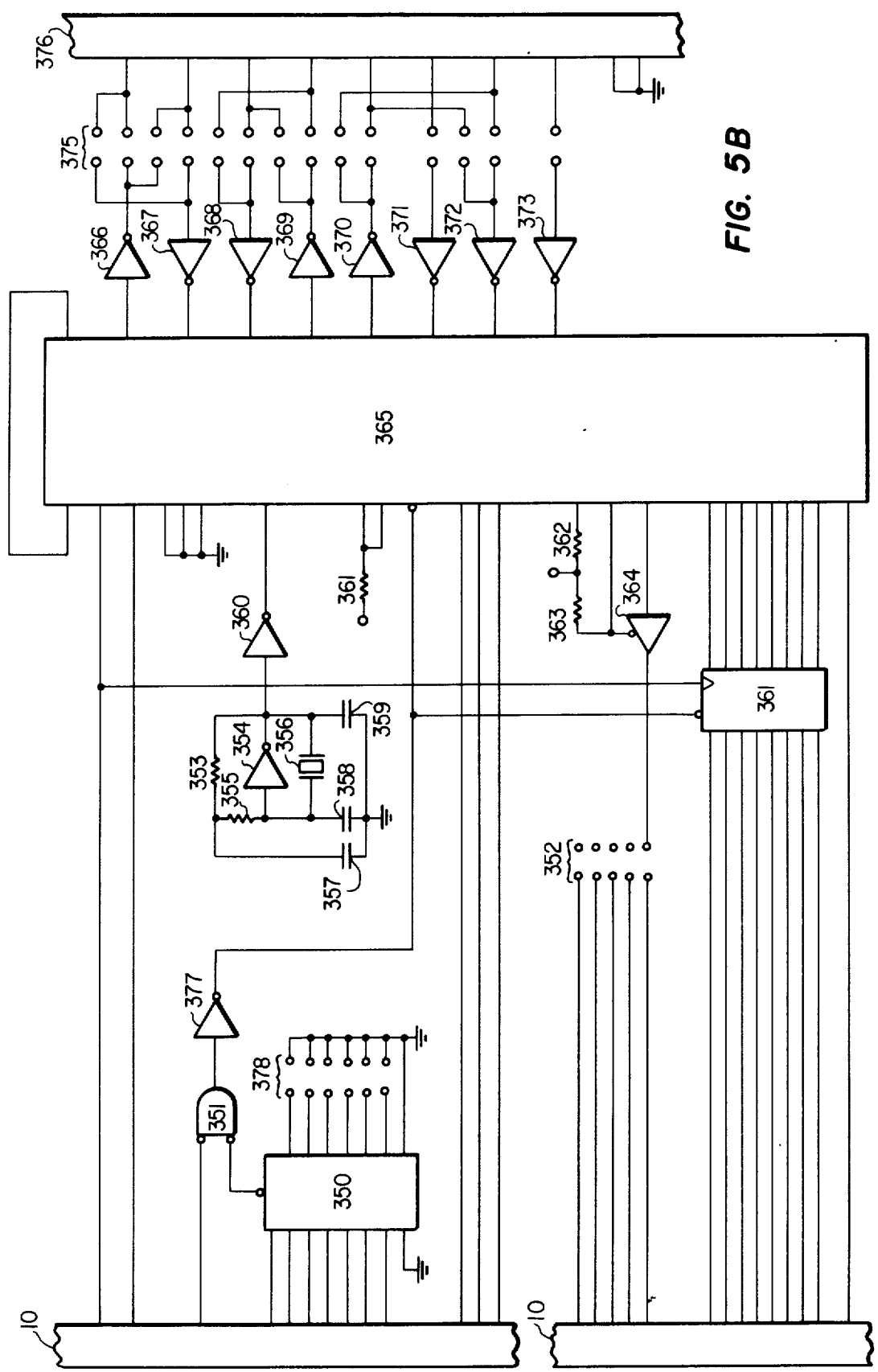

FIG. 5B illustrates a serial port centered block 365 which is an Intel 8250 device which is described in the Intel 8250 data sheet herein incorporated by reference. Port 365 includes a clock circuit consisting of crystal 356 capacitors 357–359, resistors 353 and 355 connected to inverters 354 and 360 as shown to produce the baud rates for the data transfer. The address for port 365 is set by jumpers 378 which are connected to a comparator 350. The output of comparator (74LS682) 350 is also connected to an ADDRESS ENABLE line generated by NAND gate 351 which is connected to an ADDRESS ENABLE line from bus 10. This ADDRESS ENABLE output from AND gate 351 is transmitted to port 365 through inverter 377. Data input to port 365 from bus 10 is buffered through a data buffer (74LS245) 361. Port 365 is further connected to interrupt driver circuitry including tri-state driver 364 connected to resistors 362 and 363. These are provided with jumpers 352 to allow the port to raise a user specified interrupt on bus 10. Devices 366-373 are drivers that may be configured with jumpers 375 to resemble either a data terminal or a communications terminal in accordance with the information from the Intel 8250 data sheet. The output of jumpers 375 is connected to a standard RS232 connector 376.

Figure 6:
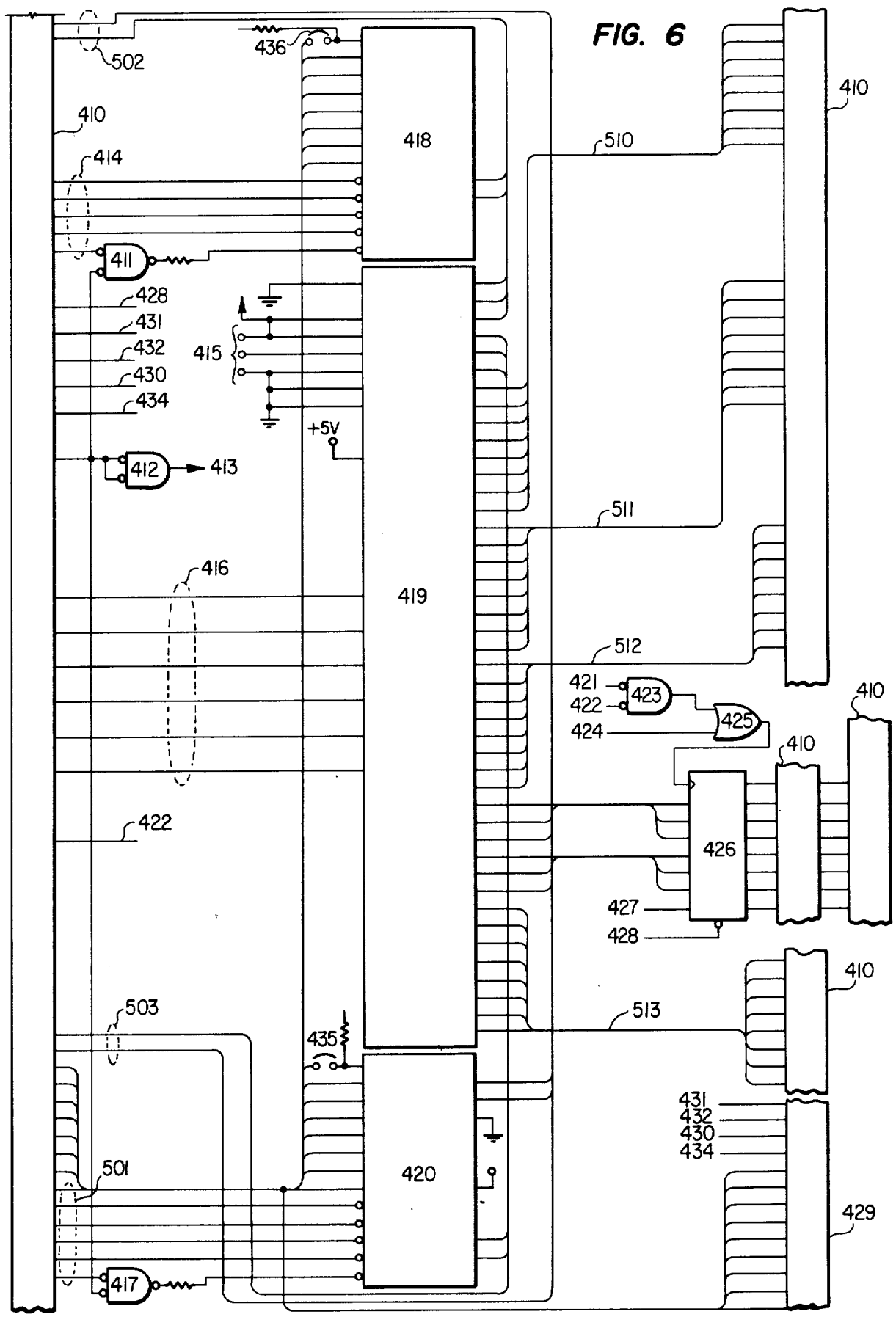
FIG. 6 is a schematic diagram of the error checking and correction circuitry.

FIG. 6 illustrates the error checking and correction circuitry. The error checking and correction capability is centered around the Intel 8206 error detection and correction unit. A detailed description of the Intel 8206 is contained within Microprocessor and Peripheral Handbook-1983 herein incorporated by reference and which details the operation of this unit and is herein incorporated by reference. The 2806 is represented by block 419 in FIG. 6 and contains several configuration lines 415 that are tied high or low to configure the 8206 as a single error correcting unit. In addition to the error correcting unit 419, two RAM banks 418 and 420 are included that contain check bits for the odd and even memory banks illustrated in FIGS. 4A and 4B. As previously discussed, six check bits are generated for a sixteen bit word with three check bits for the odd bank and three check bits for the even bank. The two check bits for the odd bank are stored in memory 418 and the two check bits for the even bank are stored in memory 420. Lines 502 and 503 are the INPUT/OUTPUT lines for the single check bits that are stored in the odd and even memories illustrated in FIGS. 4A and 4B. Lines 414 and 501 are the row and column addressing lines from the memory controller in FIGS. 4A and 4B. In addition, lines 416 represent lines from the memory controller to the error correcting unit 419 and include the ODD BANK/EVEN BANK signal, an output from error correcting unit 419 to the memory controller 200 that an error has occurred, a second signal to designate correctable errors, READ/WRITE signal and a signal that will zero or initialize all memory locations on the board. Jumpers 436 and 435 are provided to the odd and even memory banks 418 and 420 to provide to the the capability to upgrade the RAM chips 64K to 256K. Memory controller 200 through connector 234 (FIG. 4A) corresponds to blocks 410 in FIG. 6 and include lines 510 which are the input data lines for the data to be stored in the odd memory banks and lines 512 which are the data lines for the data to be stored in the even memory banks. This data is read into the error correcting unit 419 to generate the check bits. The data is then read out for the odd bank on 511 and the even bank on line 513 to be stored in the memory banks 232 and 246 on FIGS. 4A and 4B as previously discussed. In addition to providing the check bit information, the error correcting unit 419 can also provide the syndrome bits when a memory error occurs. The syndrome bits are loaded into latch (74LS324) 426 under the control of line 427 which is the LOAD EVEN signal from line 431 and the ERROR DECODE signal 428. Latch 426 is further controlled by NAND gate 423 which receives the SYNDROME ERROR STROBE output on line 413 and the MEMORY READ signal on line 422. The output of AND gate 423 is combined with the ERROR STROBE signal on line 424 and an OR gate 425 which is input into latch 426. The output of latch 426 is placed on connector 410 which is then transferred to the system bus 10. The error correcting logic in FIG. 6 further includes a test connector 429 which when further receives signals on lines 431, 432, 430 and 434 which represent READ/ODD, READ/EVEN, LOAD/ODD, and LOAD/EVEN signals from the memory controller 200 respectively. The remainder of the lines into test connector 429 are the address lines connected to the memory banks 418 and 420.

Figure 7:
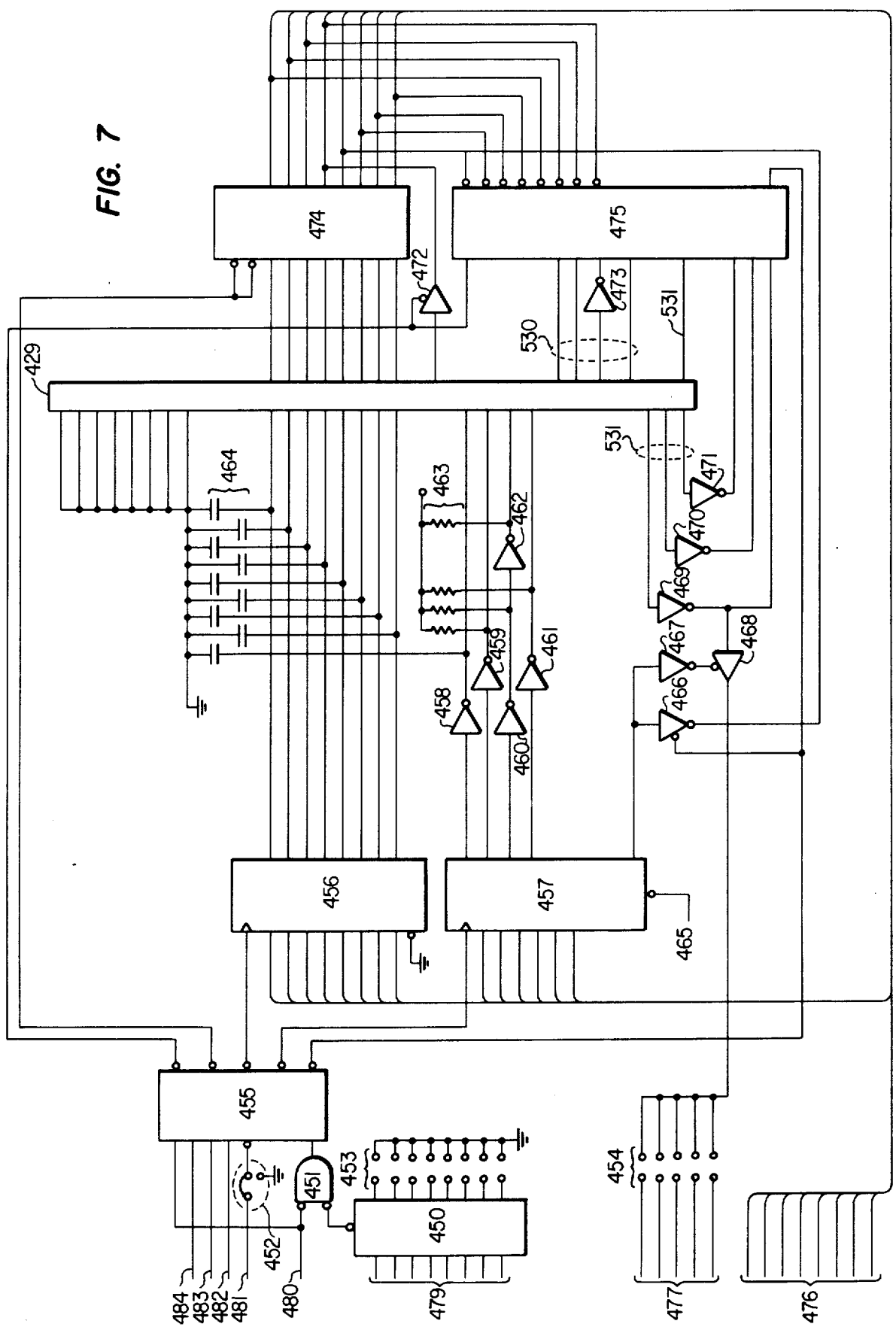
FIG. 7 is a schematic diagram of the INPUT/OUTPUT parallel port.

FIG. 7 illustrates a standard parallel port for the IBM PC. The user may select the address of this port by setting jumpers 453 that are input into comparator (74LS682) 450 to be compared with the address lines 479. When and I/O READ signal is received on line 480 or an I/O WRITE signal is received on line 484 together with an ADDRESS ENABLE signal on line 481, decoder (74LS155) 455 decodes address lines 483 and 482 which are the two least significant bits of address to activate one of five port states. Jumpers 452 are provided in order to allow the user to wire the decoder so the ADDRESS ENABLE line is always low. This port configuration includes two output latches 456 (74LS374) and 457 (74LS174) that are each enabled from decoder 455. Latch 456 is connected to an external connector 429 and array of capacitors 464 to provide impedance balancing. Latch 457 is connected to several open collector drivers 458-462 and an array of pullup resistors 463 and then connected to the external connector 429. Latch 457 also includes a RESET input on line 465. Latch 457 includes five output bits which can be control signal for an external device. Decoder 455 further includes four lines to control three input ports. One input port is buffer (74LS244) 474 which includes the capability of reading eight lines from the conductor 429. Buffer (74LS244) 475 provides input for two separate port control lines 530 and 531. Three of lines 531 are input through inverters 469-471. The output of inverter 469 is input through a tri-state driver 468 which is enabled by latch 457 through inverter 467. The output of driver 468 is connected to lines 477 through jumpers 454 to provide external device interrupts. Data is provided to the system via lines 476. This parallel port structure is similar to the printer parallel port for the IBM Personal Computer.

Information on this parallel port and the remaining system interface in general is disclosed in the IBM Personal Computer hardware reference library book entitled "Technical Reference" which is herein incorporated by reference. Data sheets for some of the specific components named are contained in the *The TTL Data Book*, second edition; the 1981 *Supplement to the TTL Data Book*, second edition; *The MOS Memory Book*. Other data sheets are available for the remaining specific components named. All data sheets for these specific components are herein incorporated by reference.

Although preferred embodiments of the invention have been described in detail, it should be understood that various changes, alterations and substituents may be made therein without departing from the spirit and scope of the invention as defined by the appended claims.

TABLE I

AO—(input)—address bit zero to indicate even boundary
RD—(input)—Ramdisk mode
BDS—(input)—Board select meaning direct access of memory
DBM—(input)—disable byte mark which is an output of the Intel 8207 memory controller
PEA—(input)—port enable Ramdisk port to place CPU in a wait state
IOR—(input)—I/O read
MEMR—(input)—memory read
MEMW—(input)—memory write
IOW—(input)—I/O write
RDCS—(input)—read command 16-set up buffers for 16 bit read on coprocessor bus
SXt—(input)—sixteen select for coprocessor mode to indicate 16 bit word transfer
ALE—(input)—address latch enable
PEALL—(input)—port enable all for clearing wait states except for Ramdisk port
WRC—(output)—command to Intel 8207 to write to memory
ODDLOC—(output)—selects odd location RAM bank
REC—(output)—command to Intel 8207 to read from memory
EL—(output)—selects even location RAM bank
CWS—(output)—clear wait state
WEODD—(output)—write enable for odd memory address locations
WEEVEN—(output)—write enable for even memory address locations
RDC—(output)—command to Intel 8207 to read from memory
SXSEL—(output)—sixteen bit transfer mode selected
ENAB—(output)—enables board operation

TABLE II $RDC\text{-} = (BDS*MEMR\text{-}*RD\text{-}) + (PEA\text{-}*IOR\text{-}*RD)$ $WRC\text{-} = (BDS*MEMW\text{-}*RD\text{-}) + (PEA\text{-}*IOW\text{-}*RD)$ $ODDLOC\text{-} = (RDC\text{-}*AO*SXT) + (RDCS\text{-}*SXT\text{-})$ $EVENLOC\text{-} = (RDC\text{-}*AO\text{-}*SXT) + (RDCS\text{-}*SXT\text{-})$ $WEEVEN\text{-} = (AO\text{-}*DBM*SXT) + (DBM*SXT\text{-})$ $WEODD\text{-} = (AO*DBM*SXT) + (DBM*SXT\text{-})$ $ENAB\text{-} = (RDC\text{-}) + (BDS*MEMW\text{-}*RD\text{-}) + (PEA\text{-}*IOW\text{-}*RD)$ $SXSEL\text{-} = (ODDLOC\text{-}*SXT) + (WEODD\text{-}*SXT)$ $CWS\text{-} = (IOW\text{-}*PEALL\text{-}*PEA) + (IOR\text{-}*PEALL\text{-}*PEA)$

What is claimed is:

1. A memory apparatus for connection to a central processing unit and to an information bus for transfer of data, addresses and control signals, said memory apparatus comprising:
   a memory circuit for retaining a plurality of data words, each data word having a unique address within an address space; and
   control means connected to said bus for obtaining one data word from or providing one data word to said memory circuit in response to an address within a first set of addresses and in response to a first set of control signals, and for obtaining at least one data word from or providing at least one data word to said memory circuit in response to a second set of control signals and in response to an address within a second set of addresses, said second set being the address space except for the first set of addresses.

2. A memory apparatus according to claim 1 wherein said first set of addresses is contiguous.

3. A memory apparatus according to claim 2 further including address selection means for enabling a user to preselect address values defining said address space.

4. A memory apparatus according to claim 3 wherein said address selection means further includes circuitry for permitting the user to select the first set of addresses.

5. A memory apparatus according to claim 4 wherein said memory circuit includes error correction circuit means for correcting erroneous data obtained from said memory circuit.

6. A memory apparatus according to claim 5 further including a plurality of input/output ports addressable by said central processing unit from said information bus.

7. A memory apparatus according to the previous claim 6 further including a real time clock addressable by said central processing unit from said information bus.

8. A memory apparatus according to claim 7 wherein said input/output ports include a serial port and a parallel port, each uniquely addressable by said central processing unit from said information bus.

9. A data processing system comprising:
   an information bus means for transferring addresses, data and control signals;
   a central processing unit connected to said information bus means for transmitting and receiving data, addresses and control signals upon said information bus and for processing said data;
   a memory apparatus connected to said information bus for retaining data words and for transmitting or receiving data words upon said information bus in response to addresses and control signals from said information bus, said memory apparatus including a memory circuit for retaining the plurality of data words, each data word having a unique address within an address space, and control means for obtaining one data word from or providing one data word to said memory circuit in response to an address within a first set of addresses and in response to a first set of control signals, and for obtaining at least one data word from or providing at least one data word to said memory circuit in response to a second set of control signals and in response to an address within a second set of addresses, said second set of addresses being the address space except for the first set of addresses;
   an input means connected to said information bus for inputting address, data and control information to said data processing system; and
   an output means connected to said information bus for providing an output of address, data or control information.

10. A data processing system according to claim 9 wherein said first set of addresses is contiguous.

11. A data processing system according to claim 10 further including address selection means for enabling a user to preselect address values defining said address space.

12. A data processing system according to claim 11 wherein said address selection means further includes circuitry for permitting the user to select the first set of addresses.

13. A data processing system according to claim 12 wherein said memory circuit includes error correction circuit means for correcting erroneous data obtained from said memory circuit.

14. A data processing system according to claim 13 further including a plurality of input/output ports addressable by said central processing unit from said information bus.

15. A data processing system according to claim 14 further including a real time clock addressable by said central processing unit from said information bus.

16. A data processing system according to claim 15 wherein said input/output ports include a serial port and a parallel port, each uniquely addressable by said central processing unit from said information bus.

* * * * *